United States Patent
Liu et al.

(10) Patent No.: US 12,056,232 B2
(45) Date of Patent: Aug. 6, 2024

(54) FUNCTION-BASED SERVICE FRAMEWORK WITH TRUSTED EXECUTION PLATFORM

(71) Applicant: EMC IP Holding Company LLC, Hopkinton, MA (US)

(72) Inventors: Jinpeng Liu, Shanghai (CN); Michael Estrin, Austin, TX (US); Zhen Jia, Shanghai (CN); Kenneth Durazzo, Morgan Hill, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 454 days.

(21) Appl. No.: 17/459,705

(22) Filed: Aug. 27, 2021

(65) Prior Publication Data
US 2023/0068880 A1    Mar. 2, 2023

(51) Int. Cl.
G06F 21/53    (2013.01)
G06F 9/455    (2018.01)
G06F 21/74    (2013.01)

(52) U.S. Cl.
CPC .......... *G06F 21/53* (2013.01); *G06F 9/45558* (2013.01); *G06F 21/74* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 8,613,070 B1* | 12/2013 | Borzycki | .............. | H04L 67/104 726/8 |
| 8,650,303 B1* | 2/2014 | Lang | ................ | G06F 21/51 726/11 |
| 8,849,978 B1* | 9/2014 | Batson | ................ | H04W 12/068 709/248 |
| 8,850,049 B1* | 9/2014 | Qureshi | ................ | H04L 41/046 709/224 |
| 9,715,597 B2* | 7/2017 | Smith | ................ | G06F 21/52 |
| 9,948,612 B1* | 4/2018 | Jawahar | .............. | H04L 63/0272 |
| 10,762,197 B1* | 9/2020 | Yu | ................ | H04L 9/50 |
| 11,323,400 B1* | 5/2022 | Hu | ................ | H04L 63/0263 |
| 2010/0281273 A1* | 11/2010 | Lee | ................ | F04B 33/00 713/193 |

(Continued)

OTHER PUBLICATIONS

Wikipedia, "Trusted Computing Base," https://en.wikipedia.org/wiki/Trusted_computing_base, Jan. 13, 2021, 4 pages.

(Continued)

*Primary Examiner* — Adam Lee
(74) *Attorney, Agent, or Firm* — Ryan, Mason & Lewis, LLP

(57) ABSTRACT

Techniques for integrating a trusted execution platform with a function-based service framework are disclosed. For example, a method obtains an application program comprising a first set of one or more functions for execution within a secure execution area of a function-based service framework and a second set of one or more functions for execution within a non-secure execution area of the function-based service framework. A client attests an attestation delegator and the attestation delegator attests one or more secure containers prior to receipt of a function execution request to execute a function in the function-based service framework.

20 Claims, 7 Drawing Sheets

(56) References Cited

U.S. PATENT DOCUMENTS

| | | | |
|---|---|---|---|
| 2011/0314534 A1* | 12/2011 | James | G06F 21/53 726/9 |
| 2013/0298201 A1* | 11/2013 | Aravindakshan | H04L 69/164 726/4 |
| 2014/0040979 A1* | 2/2014 | Barton | H04W 12/30 726/1 |
| 2014/0189807 A1* | 7/2014 | Cahill | H04L 63/0876 726/4 |
| 2014/0304326 A1* | 10/2014 | Wesley | H04L 67/1095 709/203 |
| 2014/0331333 A1* | 11/2014 | Frost | H04W 12/128 726/28 |
| 2014/0344446 A1* | 11/2014 | Rjeili | H04L 43/04 709/224 |
| 2015/0046997 A1* | 2/2015 | Gupta | H04L 63/1458 726/7 |
| 2015/0106946 A1* | 4/2015 | Soman | G06F 21/602 726/26 |
| 2015/0199213 A1* | 7/2015 | Desai | G06F 9/468 718/102 |
| 2015/0271013 A1* | 9/2015 | Singh | H04L 12/1813 709/223 |
| 2015/0304736 A1* | 10/2015 | Lal | G06F 21/10 380/210 |
| 2015/0309811 A1* | 10/2015 | Wisgo | G06F 8/71 719/331 |
| 2015/0319226 A1* | 11/2015 | Mahmood | H04L 43/0817 709/201 |
| 2015/0334162 A1* | 11/2015 | Krishnamurthy | G06F 3/0485 715/740 |
| 2015/0373023 A1* | 12/2015 | Walker | G06F 21/6218 726/3 |
| 2016/0173503 A1* | 6/2016 | Knight | H04L 63/12 726/26 |
| 2016/0191645 A1* | 6/2016 | Hayton | H04L 67/568 709/203 |
| 2016/0308858 A1* | 10/2016 | Nordstrom | H04L 9/3228 |
| 2016/0337346 A1* | 11/2016 | Momchilov | G06F 21/34 |
| 2016/0373251 A1* | 12/2016 | Kumar | H04W 12/068 |
| 2017/0017562 A1* | 1/2017 | Gulkis | H04W 4/60 |
| 2017/0024560 A1* | 1/2017 | Linde | G06F 21/305 |
| 2017/0039007 A1* | 2/2017 | Nathani | G06F 21/608 |
| 2017/0054987 A1* | 2/2017 | Rangarajan | H04N 19/167 |
| 2017/0094509 A1* | 3/2017 | Mistry | H04W 4/50 |
| 2017/0317997 A1* | 11/2017 | Smith | H04L 9/14 |
| 2017/0364685 A1* | 12/2017 | Shah | G06F 21/575 |
| 2017/0366359 A1* | 12/2017 | Scarlata | H04L 63/0823 |
| 2018/0007059 A1* | 1/2018 | Innes | G06F 21/6218 |
| 2018/0060572 A1* | 3/2018 | Singleton | G06F 21/53 |
| 2018/0096137 A1* | 4/2018 | Trostle | G06F 21/53 |
| 2018/0159856 A1* | 6/2018 | Gujarathi | H04L 63/0281 |
| 2018/0167203 A1* | 6/2018 | Belenko | H04L 9/14 |
| 2018/0205715 A1* | 7/2018 | Ingale | H04L 67/55 |
| 2018/0212966 A1* | 7/2018 | Costa | H04L 63/10 |
| 2018/0241572 A1* | 8/2018 | Miele | G06F 21/57 |
| 2018/0255591 A1* | 9/2018 | Valicherla | H04L 12/4641 |
| 2018/0332132 A1* | 11/2018 | Sampath | H04L 67/01 |
| 2018/0351941 A1* | 12/2018 | Chhabra | H04L 63/08 |
| 2019/0034617 A1* | 1/2019 | Scarlata | G06F 21/44 |
| 2019/0034652 A1* | 1/2019 | Kludy | G06F 21/6218 |
| 2019/0042315 A1* | 2/2019 | Smith | H04L 9/0637 |
| 2019/0058706 A1* | 2/2019 | Feijoo | G06F 21/335 |
| 2019/0065406 A1* | 2/2019 | Steiner | H04L 9/3271 |
| 2019/0068373 A1* | 2/2019 | Konduru | H04L 63/0853 |
| 2019/0075099 A1* | 3/2019 | Brouchier | H04L 9/0861 |
| 2019/0098096 A1* | 3/2019 | Mocanu | H04L 67/148 |
| 2019/0132299 A1* | 5/2019 | Tucker | H04W 12/0431 |
| 2019/0147188 A1* | 5/2019 | Benaloh | G06F 21/6245 726/26 |
| 2019/0149539 A1* | 5/2019 | Scruby | H04L 63/0838 713/168 |
| 2019/0220603 A1* | 7/2019 | Gopalakrishnan | G06F 21/64 |
| 2019/0245848 A1* | 8/2019 | Divoux | H04L 63/0815 |
| 2019/0268308 A1* | 8/2019 | Sinha | H04L 63/0281 |
| 2019/0340376 A1* | 11/2019 | Fleck | H04L 67/5683 |
| 2019/0342315 A1* | 11/2019 | Smelov | H04L 43/06 |
| 2020/0008029 A1* | 1/2020 | Cao | H04M 3/42178 |
| 2020/0050686 A1* | 2/2020 | Kamalapuram | G06F 21/564 |
| 2020/0076902 A1* | 3/2020 | Huang | H04L 63/0281 |
| 2020/0099738 A1* | 3/2020 | Borkar | H04L 67/63 |
| 2020/0110857 A1* | 4/2020 | Burnette | H04L 63/08 |
| 2020/0120142 A1* | 4/2020 | Maynard | G06Q 10/067 |
| 2020/0153911 A1* | 5/2020 | Chauhan | H04L 65/403 |
| 2020/0193044 A1* | 6/2020 | Dyvadheenam | H04L 67/568 |
| 2020/0218429 A1* | 7/2020 | Yu | G06F 3/0482 |
| 2020/0226101 A1* | 7/2020 | Dhanabalan | G06F 9/45558 |
| 2020/0296090 A1* | 9/2020 | Smeets | H04L 63/0823 |
| 2020/0313893 A1* | 10/2020 | Thom | H04L 63/14 |
| 2020/0328889 A1* | 10/2020 | Matetic | H04L 9/32 |
| 2020/0374324 A1* | 11/2020 | Le Strat | H04L 12/1822 |
| 2021/0011984 A1* | 1/2021 | Renke | G06F 21/552 |
| 2021/0021491 A1* | 1/2021 | Pasha | H04L 43/045 |
| 2021/0050990 A1* | 2/2021 | Hearn | H04L 9/0637 |
| 2021/0064765 A1* | 3/2021 | Lapworth | H04L 67/10 |
| 2021/0109734 A1* | 4/2021 | Vittal | G06F 11/1433 |
| 2021/0144517 A1* | 5/2021 | Guim Bernat | H04L 41/0869 |
| 2021/0165662 A1* | 6/2021 | Qiao | G06F 9/45558 |
| 2021/0200858 A1* | 7/2021 | Caspi | G06F 21/6218 |
| 2021/0218559 A1* | 7/2021 | Xia | H04L 9/0825 |
| 2021/0224426 A1* | 7/2021 | Cui | G06F 1/26 |
| 2021/0241761 A1* | 8/2021 | Dixit | G06F 9/453 |
| 2021/0248053 A1* | 8/2021 | Wei | G06F 11/3404 |
| 2021/0258171 A1* | 8/2021 | Lee | G06F 21/36 |
| 2021/0266329 A1* | 8/2021 | Fuhry | H04L 63/083 |
| 2021/0273921 A1* | 9/2021 | Kumar | G06F 21/602 |
| 2021/0279353 A1* | 9/2021 | Du | G06F 21/6218 |
| 2021/0377020 A1* | 12/2021 | Kashid | H04L 9/083 |
| 2021/0377224 A1* | 12/2021 | Soriente | H04L 9/3234 |
| 2022/0038282 A1* | 2/2022 | Teramoto | H04L 9/0894 |
| 2022/0060446 A1* | 2/2022 | Dalvi | H04L 63/0236 |
| 2022/0078007 A1* | 3/2022 | Reddem | H04L 63/0815 |
| 2022/0094547 A1* | 3/2022 | Duchastel | H04L 63/0807 |
| 2022/0114002 A1* | 4/2022 | Hoogerbrugge | G06F 9/45558 |
| 2022/0116345 A1* | 4/2022 | Xu | H04L 67/141 |
| 2022/0358220 A1* | 11/2022 | Smith | G06F 21/57 |
| 2022/0374512 A1* | 11/2022 | Gerganov | G06F 9/45558 |
| 2023/0012787 A1* | 1/2023 | Agarwal | H04L 12/4641 |

OTHER PUBLICATIONS

Github, "Open Enclave SDK," https://openenclave.io/sdk/, Accessed Jun. 4, 2021, 3 pages.

* cited by examiner

500

510

600

FUNCTION-BASED SERVICE FRAMEWORK WITH TRUSTED EXECUTION PLATFORM

FIELD

The field relates generally to information processing systems, and more particularly to trusted execution environments implemented in such information processing systems.

BACKGROUND

Trusted execution platforms are becoming widely used for various application program execution scenarios including, but not limited to, artificial intelligence (AI) applications. One example of a trusted execution platform is the Software Guard Extension (SGX) Trusted Execution Environment (TEE) hardware platform available from Intel Corporation, which can be used by applications to populate protected user code and data inside trusted environments. Once activated, the trusted hardware platform protects enclave code and data from outside access and modification. TEE has become one of the most popular solutions for a trusted execution platform with remote attestation, provisioning and sealing services to assure customers that their computing is executed in a trusted platform and their software has not been tampered with, nor has any sensitive information been leaked.

With the advent of cloud computing, attempts have been made to integrate TEE into the Infrastructure-as-a-Service (IaaS) and Platform-as-a-Service (PaaS) computing paradigms in some commercial pubic cloud confidential computing environments, e.g., Google Cloud and Microsoft Azure, to provide an out-sourced computing environment that the customer can trust.

SUMMARY

Illustrative embodiments integrate a trusted execution platform with a function-based service framework.

For example, a method obtains an application program comprising a first set of one or more functions for execution within a secure execution area of a function-based service framework and a second set of one or more functions for execution within a non-secure execution area of the function-based service framework.

In some embodiments, a client attests an attestation delegator and the attestation delegator attests one or more secure containers prior to receipt of a function execution request to execute a function in the function-based service framework. A key pair is generated for each attested secure container and used during the execution process.

These and other features and advantages of embodiments described herein will become more apparent from the accompanying drawings and the following detailed description.

DETAILED DESCRIPTION

Figure 1:
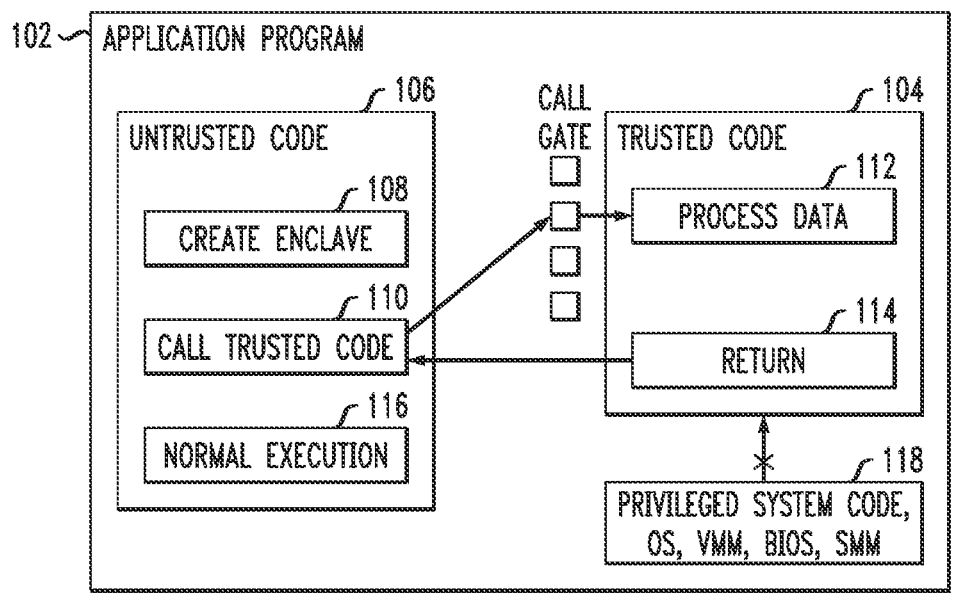
FIG. 1 illustrates an application execution environment with which one or more illustrative embodiments can be implemented.

Illustrative embodiments will now be described herein in detail with reference to the accompanying drawings. Although the drawings and accompanying descriptions illustrate some embodiments, it is to be appreciated that alternative embodiments are not to be construed as limited by the embodiments illustrated herein. Furthermore, as used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." Other definitions, either explicit or implicit, may be included below.

As mentioned above in the background section, Intel SGX TEE has been integrated into the IaaS and PaaS computing paradigms in some commercial pubic cloud confidential computing environments. However, it is realized herein that integrating TEE, or any other trusted execution platform, into the Function-as-a-Service (FaaS) computing paradigm is challenging as FaaS is an ephemeral and elastic computing paradigm, very different from IaaS and PaaS. Illustrative embodiments provide solutions to the challenges of integrating trusted execution platforms into FaaS frameworks.

Turning now to the TEE solution, details of an existing framework will be explained prior to describing some drawbacks. Illustrative embodiments are directed to integration of a TEE-based solution into a FaaS framework. However, it is to be appreciated that illustrative embodiments are not limited to implementation with the SGX TEE platform but rather are more generally applicable to other trusted execution platforms and cloud computing paradigms.

The SGX platform has hardware-assisted functionality to provide a trusted execution environment used by applications to populate protected user code and data inside "enclaves" or trusted execution areas. Once activated, the trusted hardware platform protects enclave code and data from outside access and modification. More particularly, an enclave is used to protect code and/or data from access and modification by other parties, for example, the operating system/hypervisor itself or other applications.

Furthermore, the SGX platform utilizes an attestation service that authenticates software provided by the customer to be loaded into the enclave. The attestation service attempts to ensure that the lower layer hardware platform can be trusted, for example, that the central processing unit (CPU) is a genuine product manufactured by a given vendor and that the firmware and microcode is secure without being tampered with by a malicious third-party. Further, the attestation service attempts to ensure application software (code/data) can be trusted, i.e., that code/data of the software has not been tampered with or modified by other malicious parties. Still further, the attestation service attempts to ensure that the software installation process can be trusted, i.e., the software is installed onto the platform exactly as defined without being changed or tampered with by other malicious parties. When these three aspects can be trusted, the customer will be assured that their applications are secure and cannot be exploited.

Still further, the SGX platform utilizes a provisioning service to provide confidentiality to the software by provisioning secrets and sensitive data to the enclave during runtime. After the software is attested (authenticated) by the customer, the customer can be assured that everything about the application, hardware and software, is secured, and they can then provision their secrets and sensitive data to the application running inside the enclave. Other services such as sealing, migration, and revocation construct a closed loop to consolidate the security of the application running inside the enclave.

FIG. 1 illustrates an application execution environment 100 wherein a given application program is executed in a trusted part inside a trusted part (e.g., SGX enclave in a trusted execution environment or TEE platform) and an untrusted part (e.g., outside the SGX enclave). More particularly, as shown, application program 102 has trusted code 104 and untrusted code 106. Untrusted code 106 creates an enclave in step 108 with the code/data provided by the customer. The trusted code 104 and the untrusted code 106 communicate with each other using ECALL (i.e., a call from outside the enclave to the enclave using predefined call gates) and OCALL (i.e., a call from the enclave to outside the enclave). There is no other way to call the services inside an enclave other than through the predefined call gates. For example, as shown, untrusted code 106 calls trusted code 104 in step 110 via one of the call gates. With the call gates being predefined and under stacks being checked, third-parties cannot tamper with the enclave during runtime, for example, with stack overflow attacks. In step 112, the enclave processes data and returns the process results to untrusted code 106 in step 114. Untrusted code 106 performs normal execution on the process results and/or other data in step 116. Note that, due to use of the enclave in trusted code 104, access and modification of code/data therein by other parties and applications 118 (e.g., privileged system code, operating system (OS), virtual machine monitor (VMM), basic input-output system (BIOS), system management mode (SMM), etc.) is not possible.

Figure 2:
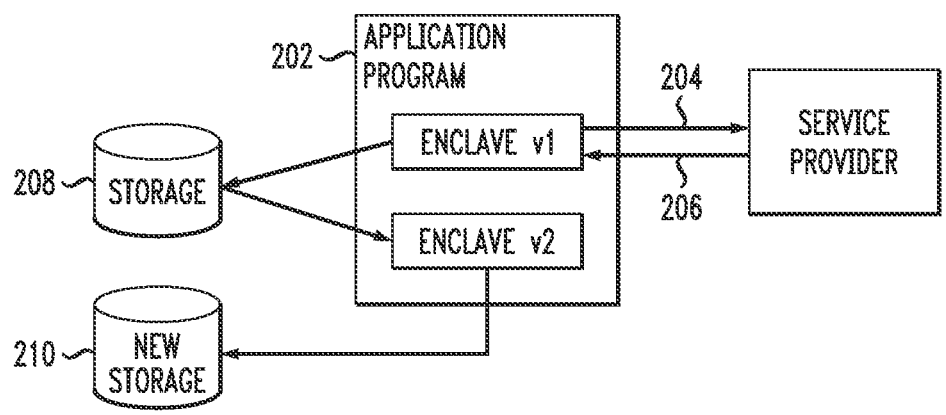
FIG. 2 illustrates an exemplary workflow in an application execution environment with which one or more illustrative embodiments can be implemented.

FIG. 2 illustrates an exemplary enclave-based TEE platform workflow 200. As shown, in step 202, the TEE platform installs an enclave (enclave v1) and measures the code/data contents and the installation process. In step 204, enclave v1 is remote attested by the data owner service provider and, in step 206, the data owner service provider provisions data to the attested enclave (enclave v1). In step 208, the enclave seals (stores) the data for future usage. The data is encrypted with a key unique to the TEE platform and enclave. After a security upgrade, a new enclave (enclave v2) reads the encrypted data back and seals (stores) the data with a new key in step 210. It is evident from FIG. 2 that, because the software (code and data) is loaded into the enclave in the enclave initialization process, the enclave can only provide authenticity of the software, but not confidentiality. To achieve confidentiality, the data must be provisioned during runtime (step 206) after attestation (step 204) by the customer via a secure channel established with the keys created during the attestation process (not expressly shown in FIG. 2). Further note that the data cannot be built into the enclave software statically, but are provided by the service provider during runtime dynamically. While the existing enclave-based TEE platform enhances security, the performance of an application is degraded while executing inside an enclave as compared with executing outside the enclave. Furthermore, for security consideration, the functions that can be called inside the enclave are very limited, for example, some filesystem input-output (IO) functions are forbidden inside the enclave.

Figure 3:
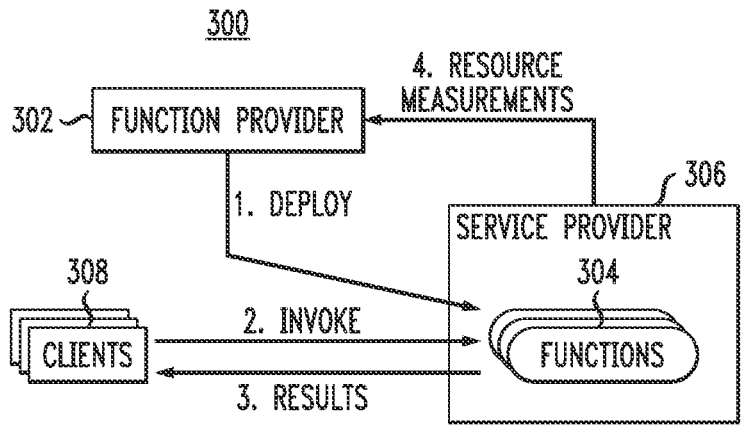
FIG. 3 illustrates a workflow of a function-based service framework with which one or more illustrative embodiments can be implemented.

FaaS is a type of cloud-computing service that allows clients to execute code in response to events without the complex infrastructure typically associated with building and launching microservices applications. FIG. 3 illustrates a typical workflow in a FaaS framework environment 300. Assume a function provider 302 deploys (step 1) one or more functions 304 to a FaaS platform at a service provider 306. Normally, one or more clients 308 invoke (step 2) a function call, and the FaaS service provider 306 organizes the hardware/software resources and the operating system (OS)/application software stack, creates a container in which the function is placed for execution, and returns (step 3) the resulting value to the requesting client. Resource measurements can be sent (step 4) from service provider 306 to function provider 302 following execution of the function call. Thus, as shown with the FaaS framework, clients 308 only need to invoke a function 304 provided by function provider 302. Service provider 306 takes care of all the provisioning and the managing of the virtual or physical server, the managing of the hardware and software stack, and the managing of the computation migration and scaling among different containers. One non-limiting example of a FaaS framework that operates similar to the FaaS framework environment 300 in FIG. 3 is the OpenWhisk architecture.

It is realized herein that there are two different solutions to cooperate containers and TEEs: (i) place a TEE enclave inside a container; and (ii) place the entire container inside a TEE enclave.

Microsoft Azure Cloud provides a confidential computing environment that provides the Intel SGX TEE service integrated into the VM or container. The Microsoft solution for a container is to import the SGX TEE hardware into the container so the application inside the container can create its enclave with the open-source toolkit Open Enclave (software development kit or SDK) which originates from Microsoft. However, the Microsoft solution merely provides an SGX-aware container and an SDK, and not a complete solution.

Figure 4:
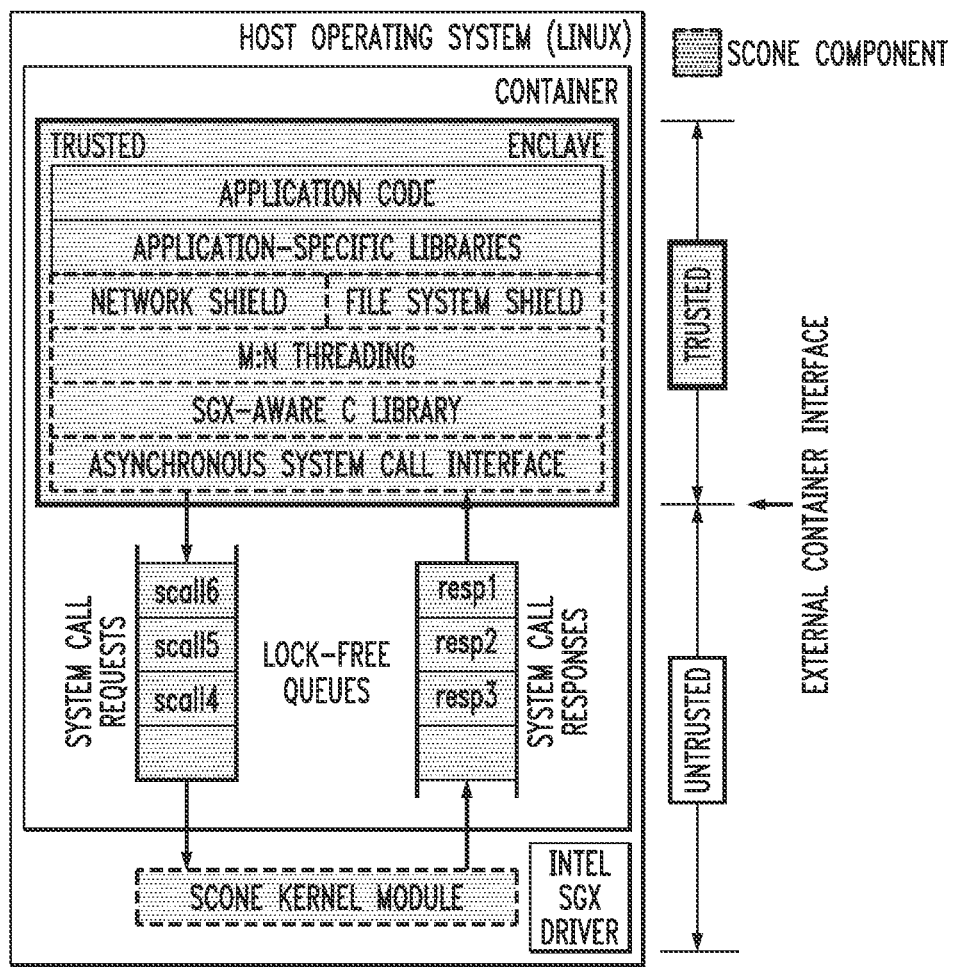
FIG. 4 illustrates an architecture of a function-based service framework with which one or more illustrative embodiments can be implemented.

Other open-source projects, for example, SCONE, provide solutions that place the entire container and its runtime support inside the TEE enclave. FIG. 4 generally illustrates a SCONE architecture 400.

Other commercial solutions to integrate the TEE into a container are available including Anjuna and Fortanix which provide a graphical user interface (GUI) and toolkit to help clients migrate their applications into the enclave, plus other security services such as key/certificate management.

These existing solutions that attempt to integrate TEE and containers have many drawbacks. For example, the Microsoft TEE-enabled containerization solution of importing the TEE capability into the container is a very primitive one since it merely imports the SGX hardware device into the container so that the applications running inside the container can be aware of the SGX and then the applications can leverage traditional enclave programming technology to protect their secrets and sensitive data. The customers must develop their applications from scratch and such containers cannot easily be integrated into FaaS.

The existing solutions from SCONE, Anjuna and Fortanix of placing the container inside the TEE enclave are for long-lived containers, for example, containers used for a program developing environment, daily build, CD/CI systems, etc., but not for the ephemeral and elastic computing paradigm of FaaS (the function inside FaaS normally lasts a very short time and the container can be transparently scaled or migrated by the container orchestrator, for example, Kubernetes).

Furthermore, it is realized herein that a solution that places the application, the container image, the container filesystem, and the runtime support into the enclave has the following problems:
  (i) One of the most important principles of the Intel SGX is to put as few functions as possible into the enclave and leave most of the application outside the enclave to minimize the attacking surface. SGX will forbid most of the C library function calls to guarantee the enclave security in its SDK. These solutions introduce many things into the enclave and enable these functions inside the enclave to increase the Trusted Computing Base (TCB) of the enclave, and may introduce vulnerabilities into the enclave.
  (ii) The computing resources of the TEE are very limited and therefore must be allocated carefully. Placing everything inside the enclave wastes the computing resources for other applications and costs clients significantly more. For example, a typical 4 VCPU VM with TEE in Microsoft Azure Cloud costs, per month, almost seven times more than a normal one.
  (iii) Running the same function inside the enclave is much slower than running it outside the enclave. For example, it is realized herein that executing a typical HelloWorld program inside the enclave takes about 30 seconds. Placing everything inside the enclave penalizes the application performance greatly.

Figure 5A:
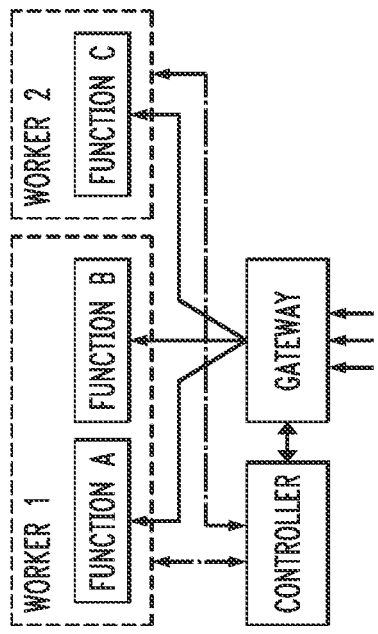
FIGS. 5A and 5B further illustrate an architecture of a function-based service framework with which one or more illustrative embodiments can be implemented.
Figure 5B:
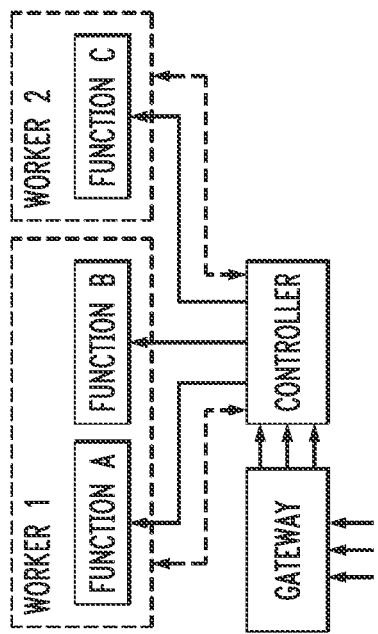

Still further, it is realized that the current FaaS infrastructure may leak sensitive information of clients. FIGS. 5A and 5B respectively show two different typical structures 500 and 510 of the current FaaS infrastructures, which use a gateway to terminal client requests from a public network and a controller as a task scheduler (controller as shown) to schedule the invocation of the function inside the internal network in FIG. 5A, or vice versa in FIG. 5B. In both cases, the function body, the input, and the output from the client are stored/forwarded between the controller and the worker in clear-text in the message queue in the FaaS infrastructure, which may be eavesdropped on by an insider attacker from the service provider and result in sensitive information leakage.

Yet further, it is realized herein that simply placing the current containerization of the TEE into FaaS may result in too many attestations during scaling and will result in cold start and long latency. That is, if there are many requests to the same function simultaneously from the clients, the FaaS infrastructure spawns the function workers by creating many new container instances for transparent scalability. Before executing the function inside the container in the enclave, each enclave should be remote-attested by the clients or the function provider to make sure each container has been installed and will function appropriately. However, such a solution results in the following problems:
  (i) Theoretically, the spawn of the new container instance should be client unaware, but so many attestations will significantly burden the clients or the function providers, i.e., they have to process the attestation requests from nowhere.
  (ii) Most importantly, remote attestation is a time-consuming operation, i.e., it will result in the cold-start of the function. For an ephemeral and elastic programming paradigm such as FaaS, this is unacceptable. Assume how impractical it would be if a function call itself only spends a few milliseconds, but the remote attestation and cold start of the function takes several seconds or minutes.

It is also realized that current SGX TEE implementations do not adequately support FaaS function attestation. That is, during SGX runtime measuring the enclave, only a few bytes at the beginning of the memory page are measured. If a FaaS function is not included in this measure, the client/function provider cannot make sure the function to be invoked is the correct function they provided. The attackers may replace the correct function with their own to steal sensitive information from the clients, to give the wrong output back to the client.

In the Microsoft Open Enclave SDK implementation, an enhanced feature is provided to enable all contents in the memory pages to be measured to support the FaaS function attestation. However, this solution has the following problems:
  (i) Measuring all contents inside the memory pages will result in longer latency during FaaS execution.
  (ii) To enable the function to be measured, the function must be loaded into the enclave in clear text, which may expose the function to the outside world.

Illustrative embodiments overcome the above and other drawbacks by integrating a trusted execution platform (e.g., SGX TEE) into a function-based service framework (e.g., FaaS framework) as will be explained in further detail below in the context of FIGS. 6 and 7.

In order to effectively configure a trusted execution platform to protect functions in an FaaS framework, the nature of an attack model against an FaaS function should be understood. For example, attack vectors of a FaaS function may be described as follows:
  (i) The function body itself needs to be protected. If the function is written in script languages (e.g., JavaScript, Python, etc.), the attacker can read the function source code directly. If the function is provided by a compiled binary executable, the attacker will try to run this function in another machine for trial. Remember that FaaS function execution is stateless, which means only the input and the function body will determine the function runtime behavior, and the input can easily be obtained if it is transported in clear text. Accordingly, the attacker can obtain enough information (for example, the memory access patterns) of the runtime behavior of the target function. With this information, the attacker can easily launch a side-channel attach or exploit other vulnerabilities in the function for further attacks.
  (ii) The input and output of the function need to be protected. For example, if a company is using FaaS to run their annual financial report based on the records stored in a database, then the input financial data and the output report are likely very sensitive to the company and need to be protected to avoid leakage.
  (iii) The client needs to make sure that the function that is executing is the exact function they provided. Assuming the above-mentioned annual financial report scenario, if the financial function is tampered with by a malicious third party, a fraud function may be executed instead of the one provided by the client/function provider. This fraud function will calculate the annual report correctly, but it will also steal all financial records stored in the database.

Figure 6:
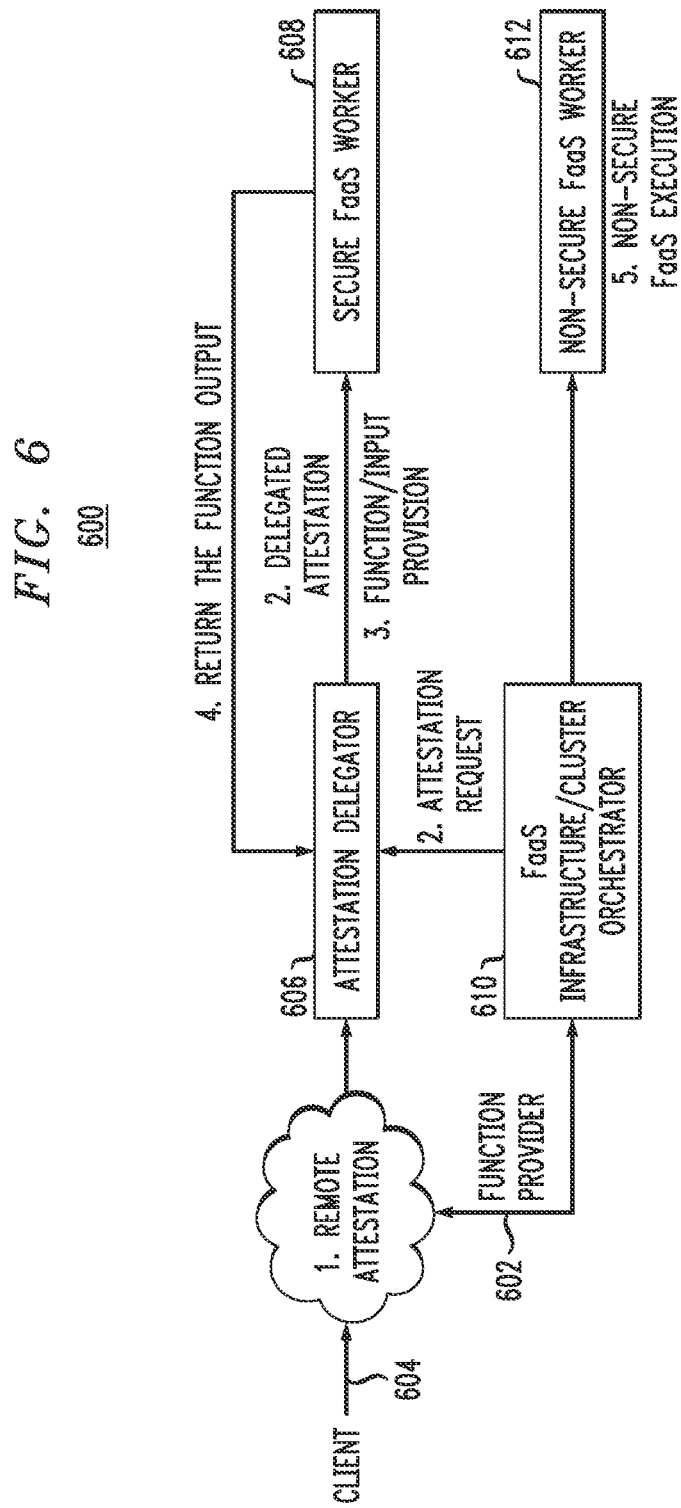
FIG. 6 illustrates integration of a trusted execution platform with a function-based service framework according to an illustrative embodiment.

FIG. 6 illustrates a workflow 600 for an architecture integrating a trusted execution platform (e.g., SGX TEE) into a function-based service framework (e.g., FaaS framework) according to an illustrative embodiment. In this illustrative embodiment, a SCONE implementation is used as a TEE-enabled secure container building block, although alternative embodiments may be implemented with other FaaS frameworks.

As shown, workflow 600 involves a function provider 602, a client 604, an attestation delegator 606, a secure FaaS worker node 608, FaaS infrastructure and container cluster orchestrator (collectively) 610, and a non-secure FaaS worker node 612.

In accordance with illustrative embodiments, the functions that comprise a given application program are split into trusted and untrusted parts. It is realized to put the entire application and all its functions into an enclave and then try to harden the security boundary is not practical and bad practice as unnecessary codebase inside the enclave attempting to communicate to the outside world will expose the inside vulnerabilities to the attacker to be exploited. Rather, illustrative embodiments distinguish functions of the application into a trusted part (e.g., security-sensitive data/logic) and an untrusted part (e.g., security insensitive data/logic). The functions in the trusted part are executed by the secure FaaS worker node 608, while the functions in the untrusted part are executed in the non-secure FaaS worker node 612. Steps 1-5 of workflow 600 will be explained below in the context of these architecture components. For the functions in the untrusted part, step 5 executes these functions as per the existing FaaS framework and will thus not be described in any further detail.

Normally, clients are not willing to refactor their legacy applications due to the huge coding effort and the risk of introducing new bugs. However, splitting an application into a trusted part and an untrusted part according to illustrative embodiments is reasonable because if the clients need to migrate their legacy applications into FaaS, they need to refactor their applications anyway, from the monolithic application to separated stateless functions, so it is not so much an extra effort for the clients as might initially be imagined. Further, to distinguish the security-sensitive data/logic from the insensitive part is not so difficult for the clients and only they can understand their business. At least, if they are not so sure if a function is security-sensitive, they can classify it as a sensitive one out of an abundance of caution.

Illustrative embodiments provide enhancement to FaaS infrastructure/container cluster orchestrator 610. Currently, to call a function inside FaaS, two requests need to be submitted to the FaaS infrastructure: one request to submit the function to the FaaS infrastructure, for example, OpenWhisk, from its portal; and another request to call the function with input parameters. Illustrative embodiments change the submission format when client 604 wants to run a secure function by adding an SEC flag into the submission. Upon receiving the request with an SEC flag, the FaaS infrastructure informs the controller of the container cluster orchestrator to schedule this function into one or more TEE-enabled secure containers.

Currently, the container cluster orchestrator is unaware of the TEE-enabled secure container (for example, SCONE SGX container implementation), but this problem can be solved. For example, SCONE has provided a plug-in to Kubernetes so that Kubernetes can detect if a container is TEE-enabled by checking if a/dev/sgx file is hosted in the OS and orchestrate the TEE-enabled secure containers differently from other normal containers. The controller will specify a pre-installed attestation delegator (606) to client 604. A FaaS infrastructure that supports confidential function execution can pre-install many attestation delegators beforehand as part of its service to optimize the performance.

Attestation delegator 606 is an enclave itself that is dedicated to a specific client (e.g., 604) who has submitted a request with an SEC flag. More particularly, upon receiving this request, the controller schedules attestation delegator 606 for client 604 with its public Internet Protocol (IP) address. As attestation delegator 606 itself is an enclave, client 604 can execute the standard remote attestation procedure against attestation delegator 606 as shown in step 1. The remote attestation procedure ensures the hardware of the host of attestation delegator 606 is secure, and that the attestation delegator software itself is functioning as the service provider claimed to attest the function execution container (worker) so that the worker is secure and will execute the function provisioned by the client in a trusted manner. The attestation of the worker container ensures the worker container is secure, meaning that the function executed inside the container is the one submitted by client 604, instead of a fraudulent one to steal the information from the client (so that the first attack vector mentioned above is defended against. After remote attestation of the attestation delegator 606 is successful, a secure SSL/TLS (Secure Sockets Layer/Transport Layer Security) connection key pair is generated between client 604 and attestation delegator 606. Client 604 then can establish a secure SSL/TLS connection to attestation delegator 606 and provision the functions and their inputs via the secure connection. As this secure connection is encrypted with the session key, the submitted function, input will not be exposed to the outside world.

When a new TEE-enabled secure container is instantiated, the controller (610) can pre-schedule it to some secure execution of the functions from possible clients represented by attestation delegators beforehand. The controller then sends a notification to each possible attestation delegator (606) as shown in step 2. Then, each possible attestation delegator (606) remote attests the TEE-enabled secure container and this attestation procedure generates an SSL/TLS key for each peer, and each endpoint will save the key for the peer.

Figure 7:
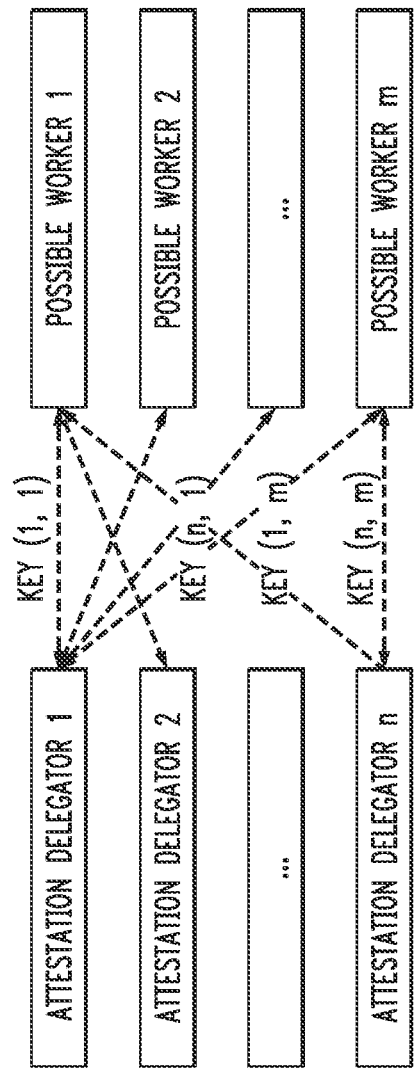
FIG. 7 illustrates key pair generation according to an illustrative embodiment.

If there are m secure container instances which the controller decided that may be put into execution for the functions from n specified clients, after the remote attestations from each attestation delegator to each secure container instance, there will be m×n keys generated during this remote attestation procedure, as illustrated in key pair generation workflow 700 in FIG. 7.

As shown in FIG. 7, the attestation delegator 1 to n will save m keys which are for the containers from 1 to m, respectively. Containers 1 to m will save n keys for the attestation delegators 1 to m, respectively.

Note that the attestation of the worker container is delegated by attestation delegator 606, and no attestation request will reach client 604. Because the secure FaaS worker node 608 is attested during its initiation and many container instances can be initiated to prepare a burst of requests for a certain function beforehand (this is the practice for almost all FaaS frameworks), the containers can be attested before scheduling a function into them for execution. When a secure container is attested, the container has just been initiated and there is no function scheduled into this container. Thus, many containers will have the same measures (as they have the same hardware configuration and software stack) and the attestation delegator can cache different measures for different function interpreters or executors to accelerate the remote attestation procedure.

The attestation procedure generates the key between the worker container and the attestation delegator, and no real secure connection is established at that time. As per FIG. 7, the key is used when a container, for example, container (referred to as possible worker) 2, is scheduled for the function from a client, for example, attestation delegator 3, then these two endpoints establish the secure connection with key (2, 3) from their saved keys.

From the description above, it is evident that with the attestation delegator, the following benefits occur:
(i) In some scenarios, the workers cannot be accessed from the outside world due to security reasons. Most cloud providers will not expose their internal network topology. The customers can access their VM via public IP, but cannot directly access the host machine.
(ii) There are many workers, but only one attestation delegator. Thus, equipped with the attestation delegator, one connection between the FaaS infrastructure and the client is sufficient; otherwise, there will be many connections between each worker to the client.
(iii) The container cluster orchestrator dynamically schedules the workers to a function. It cannot be known which worker will be scheduled for the function beforehand, and this means the connection between the client and the worker is dynamically created. With the attestation delegator, this connection is inside the provider's internal local network and therefore low latency; otherwise, the connection is across the WAN with high latency.
(iv) There may be many workers for a single function if there are many requests for this function simultaneously in a burst. In this case, without the attestation delegator, there will be many attestation requests sent to the client at the same time. However, with the attestation delegator, the attestation delegator attests all workers internally and automatically.

Figure 8:
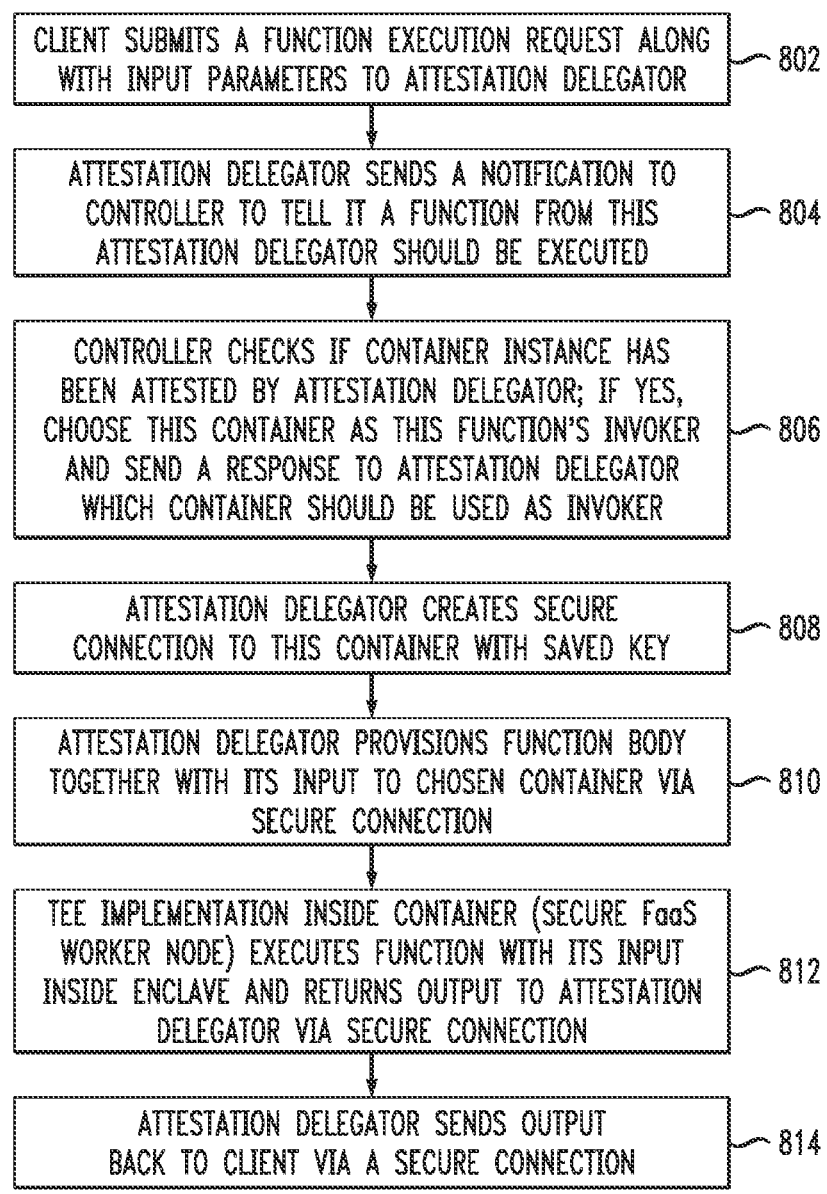
FIG. 8 illustrates a methodology for executing a function in a secure execution area of a function-based service framework according to an illustrative embodiment.

FIG. 8 illustrates a methodology 800 to execute a function securely (with reference back to FIG. 6) according to an illustrative embodiment.

Step 802: Client 604 submits a function execution request along with the input parameters to attestation delegator 606.

Step 804: Attestation delegator 606 sends a notification to the controller (610) to tell it a function from this attestation delegator should be executed.

Step 806: The controller (610) checks if a container instance has been attested by attestation delegator 606 already. If yes, it will choose this container as this function's invoker and send a response to attestation delegator 606 which container should be used as the invoker. This check can be integrated in a straightforward manner into the controller's scheduling policy.

Step 808: Attestation delegator 606 creates a secure connection to this container with the saved key.

Step 810: Attestation delegator 606 provisions the function body together with its input to the chosen container via the secure connection (as depicted by step 3 of FIG. 6).

Step 812: The TEE implementation inside the container (secure FaaS worker node 608) executes this function with its input inside the enclave and returns the output to attestation delegator 606 via the secure connection (as depicted in step 4 of FIG. 6).

Step 814: Attestation delegator sends the output back to the client via a secure connection.

Illustrative embodiments provision the function during runtime, instead of during the initialization of the enclave, because:
(i) Without the function inside the enclave during the initialization, the secure container can be attested before the function execution. This saves most of the time during the function execution and can avoid the function cold start.
(ii) By provisioning the function during runtime, the function body is protected against from eavesdropping.

Advantageously, as explained herein in detail, illustrative embodiments provide a solution that can be easily integrated into the current FaaS framework to support secure function execution. More particularly, illustrative embodiments are integrated into a FaaS framework to protect the function body, input, and output and make sure the function executed by the FaaS service provider is the same provided by the client.

Further, illustrative embodiments execute only the security sensitive part of the application inside the secure container. That is, the application is split into two parts: the security-sensitive part and the insensitive part and only the sensitive part is executed inside the secure container. This can be integrated in a straightforward manner into the FaaS portal as well. Most applications have a very small part that is security-sensitive. Thus, splitting the application yields the following benefits:
(i) Save TEE resources: As FaaS is charged by use of computing resources, this will save the cost of the client and the provider can serve more clients.
(ii) With only the security-sensitive part being placed into the secure container, the TCB of the application is minimized, which greatly improves the application security.
(iii) With only a very small part of the application running inside the secure container, very few functions need to be attested according to illustrative embodiments and executed inside the enclave, and most of the application remains unchanged.

As the connections from the client to the worker container are secure, and the function is executed inside the enclave, the function body, the input, and the output are invisible from the outside world, hence no data will be leaked.

Still further, only one remote attestation from the client and all secure containers will be invoked immediately. As all attestations of the workers are delegated, the client only needs to attest the attestation delegator once. As described above, this attestation of the secure worker container can be done before the function execution and therefore will not lengthen the function execution time. Also, to provision the function during runtime, all memory pages need not be measured, and thus will save the attestation time and protect the function body from exposure.

Figure 9:
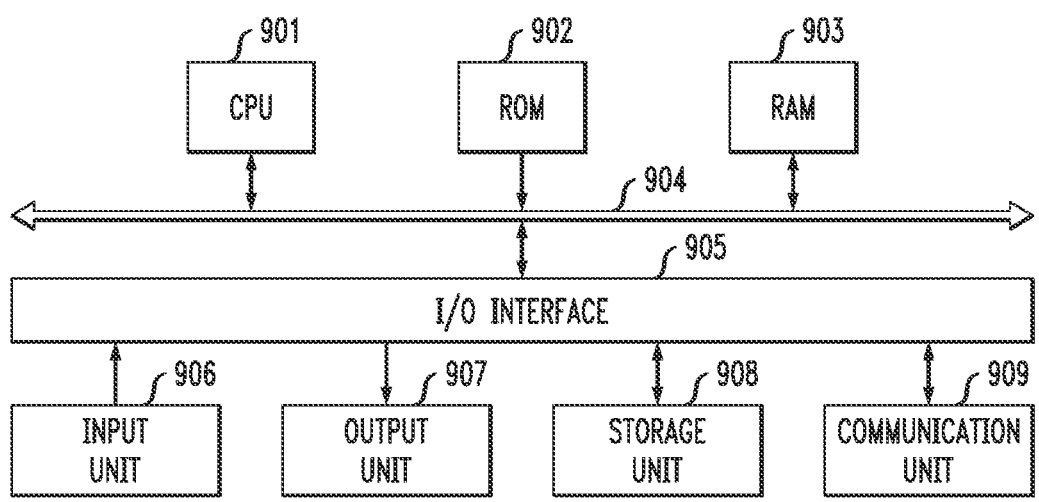
FIG. 9 illustrates a processing platform used to implement an information processing system with execution environment functionalities according to an illustrative embodiment.

FIG. 9 illustrates a block diagram of an example processing device or, more generally, an information processing system 900 that can be used to implement illustrative embodiments. For example, one or more components in FIGS. 1-8 can comprise a processing configuration such as that shown in FIG. 9 to perform steps described herein. Note that while the components of system 900 are shown in FIG. 9 as being singular components operatively coupled in a local manner, it is to be appreciated that in alternative embodiments each component shown (CPU, ROM, RAM, and so on) can be implemented in a distributed computing infrastructure where some or all components are remotely distributed from one another and executed on separate processing devices. In further alternative embodiments, system 900 can include multiple processing devices, each of which comprise the components shown in FIG. 9.

As shown, the system 900 includes a central processing unit (CPU) 901 which performs various appropriate acts and processing, based on a computer program instruction stored in a read-only memory (ROM) 902 or a computer program instruction loaded from a storage unit 908 to a random access memory (RAM) 903. The RAM 903 stores therein various programs and data required for operations of the system 900. The CPU 901, the ROM 902 and the RAM 903 are connected via a bus 904 with one another. An input/output (I/O) interface 905 is also connected to the bus 904. It is to be appreciated that component 901 in FIG. 9 can alternatively or additionally represent an accelerator such as, but not limited to, a TPU, a GPU, and combinations thereof.

The following components in the system 900 are connected to the I/O interface 905, comprising: an input unit 906 such as a keyboard, a mouse and the like; an output unit 907 including various kinds of displays and a loudspeaker, etc.; a storage unit 908 including a magnetic disk, an optical disk, and etc.; a communication unit 909 including a network card, a modem, and a wireless communication transceiver, etc. The communication unit 909 allows the system 900 to exchange information/data with other devices through a computer network such as the Internet and/or various kinds of telecommunications networks.

Various processes and processing described above may be executed by the CPU 901. For example, in some embodiments, methodologies described herein may be implemented as a computer software program that is tangibly included in a machine readable medium, e.g., the storage unit 908. In some embodiments, part or all of the computer programs may be loaded and/or mounted onto the system 900 via ROM 902 and/or communication unit 909. When the computer program is loaded to the RAM 903 and executed by the CPU 901, one or more steps of the methodologies as described above may be executed.

Illustrative embodiments may be a method, a device, a system, and/or a computer program product. The computer program product may include a computer readable storage medium having computer readable program instructions thereon for causing a processor to carry out aspects of illustrative embodiments.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of illustrative embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Various technical aspects are described herein with reference to flowchart illustrations and/or block diagrams of methods, device (systems), and computer program products according to illustrative embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other devices to produce a computer implemented process, such that the instructions which are executed on the computer, other programmable devices, or other devices implement the functions/acts specified in the flowchart and/or block diagram block or blocks.

The flowchart and block diagrams illustrate architecture, functionality, and operation of possible implementations of systems, methods and computer program products according to various embodiments. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method executed in a function-based service framework, the function-based service framework comprising at least one processor and at least one memory storing computer program instructions that when executed by the processor execute the method comprising:
   obtaining an application program comprising a first set of one or more functions for execution within a secure execution area of the function-based service framework and a second set of one or more functions for execution within a non-secure execution area of the function-based service framework;
   submitting a function execution request and a flag to an attested delegator to execute a function from the first set of one or more functions in the secure execution area, wherein the attested delegator is a secure enclave dedicated to a client and the flag indicates that the function is a secure function;
   receiving a delegated attestation from the attested delegator, wherein prior to receipt of the function execution request and the flag, the attested delegator:
   instantiates one or more secure containers in the secure execution area;
   schedules secure execution of the function by the one or more secure containers; and
   attests the one or more secure containers during the instantiation and before the scheduling; and
   receiving, from the attested delegator, a result of an execution of the function.

2. The method of claim 1, wherein the attested delegator sends a notification to a controller associated with the function-based service framework that the function associated with the request is to be executed in the secure execution area.

3. The method of claim 2, wherein a given secure container of the one or more secure containers is where the function is to be executed when the given security container has previously been attested by the attested delegator.

4. The method of claim 3, wherein a secure connection is established between the attested delegator and the given secure container.

5. The method of claim 4, wherein the attested delegator provisions a body and an input of the function to the given container via the secure connection.

6. The method of claim 5, wherein the function is executed in the secure container.

7. The method of claim 6, wherein a result of the execution of the function is sent from the secure container to the attested delegator.

8. The method of claim 3, wherein a key pair is generated for each attested secure container.

9. The method of claim 1, wherein the function-based service framework comprises a Function-as-a-Service (FaaS) framework and the secure execution area comprises a hardware-based trusted execution platform.

10. A system, comprising:
    a function-based service framework comprising a processor coupled to a memory, the processor, when executing program code of the memory, is configured to operate the function-based service framework to:
    obtain an application program comprising a first set of one or more functions for execution within a secure execution area of the function-based service framework and a second set of one or more functions for execution within a non-secure execution area of the function-based service framework;
    submit a function execution request and a flag to an attested delegator to execute a function from the first set of one or more function in the secure execution area, wherein the attested delegator is a secure enclave dedicated to a client and the flag indicates that the function is a secure function;
    receive a delegated attestation from the attested delegator, wherein prior to receipt of the function execution request and the flag, the attested delegator:
    instantiates one or more secure containers in the secure execution area;
    schedules secure execution of the function by the one or more secure containers; and
    attests the one or more secure containers during the instantiation and before the scheduling; and
    receive, from the attested delegator, a result of an execution of the function.

11. The system of claim 10, further comprising a controller configured to receive from the attested delegator a notification that the function associated with the request is to be executed in one of the first set of one or more secure containers.

12. The system of claim 11, wherein a given secure container of the one or more secure containers is where the function is to be executed when the given security container has previously been attested by the attested delegator.

13. The system of claim 12, wherein a secure connection is established between the attested delegator and the given secure container.

14. The system of claim 13, wherein the attested delegator provisions a body and an input of the function to the given container via the secure connection.

15. The system of claim 14, wherein the given container executes the function.

16. A computer program product stored on a non-transitory computer-readable medium and comprising machine executable instructions, the machine executable instructions, when executed by a function-based service framework comprising a processor coupled to a memory, cause the function-based service framework to:
   obtain an application program comprising a first set of one or more functions for execution within a secure execution area of the function-based service framework and a second set of one or more functions for execution within a non-secure execution area of the function-based service framework;
   submit a function execution request and a flag to an attested delegator to execute a function from the first set of one or more function in the secure execution area, wherein the attested delegator is a secure enclave dedicated to a client and the flag indicates that the function is a secure function;
   receive a delegated attestation from the attested delegator, wherein prior to receipt of the function execution request and the flag, the attested delegator:
      instantiates one or more secure containers in the secure execution area;
      schedules secure execution of the function by the one or more secure containers; and
      attests the one or more secure containers during the instantiation and before the scheduling; and
   receive, from the attested delegator, a result of an execution of the function.

17. The computer program product of claim 16, wherein a key pair is generated for each attested secure container.

18. The computer program product of claim 17, wherein the attested delegator sends a notification to a controller associated with the function-based service framework that the function associated with the request is to be executed in the secure execution area.

19. The computer program product of claim 18, wherein a given secure container of the one or more secure containers is where the function is to be executed when the given security container has previously been attested by the attested delegator.

20. The computer program product of claim 19, wherein a secure connection is established between the attested delegator and the given secure container.

* * * * *